(12) United States Patent
Rohani et al.

(10) Patent No.: US 10,317,524 B2
(45) Date of Patent: Jun. 11, 2019

(54) SYSTEMS AND METHODS FOR SIDE-DIRECTED RADAR FROM A VEHICLE

(71) Applicants: Mohsen Rohani, Gatineau (CA); Song Zhang, Ottawa (CA)

(72) Inventors: Mohsen Rohani, Gatineau (CA); Song Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 15/262,568

(22) Filed: Sep. 12, 2016

(65) Prior Publication Data

US 2017/0299714 A1    Oct. 19, 2017

Related U.S. Application Data

(60) Provisional application No. 62/323,202, filed on Apr. 15, 2016.

(51) Int. Cl.
*G01S 7/04* (2006.01)
*G01S 13/90* (2006.01)
*G01S 13/93* (2006.01)

(52) U.S. Cl.
CPC .............. *G01S 13/90* (2013.01); *G01S 7/043* (2013.01); *G01S 13/931* (2013.01); *G01S 2013/9385* (2013.01)

(58) Field of Classification Search
CPC ...... G01S 13/90; G01S 78/043; G01S 13/931; G01S 2013/9385
USPC ....................................................... 342/25 A
See application file for complete search history.

(56) References Cited

U.S. PATENT DOCUMENTS

| 5,247,306 A | * | 9/1993 | Hardange | ............. G01S 13/931 342/70 |
| 6,121,916 A | * | 9/2000 | McDade | ............... G01S 13/931 342/114 |
| 6,542,111 B1 | * | 4/2003 | Wilson | ...................... B60T 7/22 180/168 |

(Continued)

FOREIGN PATENT DOCUMENTS

| CN | 101303732 A | 11/2008 |
| CN | 102809379 A | 12/2012 |

(Continued)

OTHER PUBLICATIONS

Werber, Klaudius et al, Automotive Radar Gridmap Representations (2015). 2015 IEEE MTT-S International Conference on Microwaves for Intelligent Mobility, Heidelberg: (IEEE) Institute of Electrical and Electronics Engineers.

(Continued)

*Primary Examiner* — Frank J McGue (57) ABSTRACT

A system and method to sense an environment based on data acquired by side looking radar. For example, a side looking radar is mounted on one or both sides of a ground-based vehicle and performs measurements from environment while the vehicle is moving. As the vehicle moves, a scan of the environment is therefore performed, wherein movement of the vehicle provides another dimension of information for the scan. In another example, the radar can further scan in the vertical plane at a fixed side looking angle to increase the field of view. A 3D map and localization can be determined from the scan.

21 Claims, 7 Drawing Sheets

(56) References Cited

U.S. PATENT DOCUMENTS

2012/0056773 A1* 3/2012 Sato ........................ G01S 7/354
                                                            342/109
2014/0247181 A1* 9/2014 Nogueira-Nine ....... G01S 13/26
                                                            342/128

FOREIGN PATENT DOCUMENTS

| CN | 103890606 A | 6/2014 |
| CN | 104024880 A | 9/2014 |
| CN | 104764457 A | 7/2015 |
| CN | 104914863 A | 9/2015 |
| EP | 1942353 A1 | 7/2008 |

OTHER PUBLICATIONS

Brooker, Graham et al (2007). Millimetre Wave 3D Imaging for Industrial Applications. AusWireless 2007 Second International Conference on Wireless Broadband and Ultra Wideband Communications, Sydney: (IEEE) Institute of Electrical and Electronics Engineers.
Maddern, Will et al (2015). Leveraging Experience for Large-scale LIDAR Localization in Changing Cities, 2015 IEEE International Conference on Robotics and Automation, Seattle: (IEEE) Institute of Electrical and Electronics Engineers, pp. 1684-1691.
Christian Wolff, Radar Tutorial: Radar Basics, http://www.radartutorial.eu/01.basics/!rb02.en.html.

* cited by examiner

SYSTEMS AND METHODS FOR SIDE-DIRECTED RADAR FROM A VEHICLE

CROSS-REFERENCE

This application claims the benefit of priority to U.S. Provisional Patent Application No. 62/323,202 filed Apr. 15, 2016 entitled "Systems and Methods for Side-directed Radar from a Vehicle" which is hereby incorporated by reference in its entirety into the Detailed Description of Example Embodiments herein below.

FIELD

At least some example embodiments relate to sensing, detection, mapping, and/or localization using radar.

BACKGROUND

Accurate high definition maps of various environments are used for various applications including autonomous vehicles, robotics, aircraft, drones, agriculture, civil engineering, geology, soil science, and mining In certain applications, environmental mapping is also used for localization of an object within an environment.

Various methods presently exist for building high definition digital maps of an environment including methods and systems that rely on light detection and ranging ("LIDAR") as well as camera/vision based sensors and systems ("vision"). LIDAR uses ultraviolet, visible or near infrared light to image objects. LIDAR systems are accurate and can be used to provide a high resolution two or three dimensional map of an environment. Wavelengths used in LIDAR systems may vary to suit the target and can range from approximately 10 micrometers to the ultraviolet range (e.g., approximately 250 nanometers).

Vision systems use visible light to image objects, are cheaper than LIDAR systems and can provide color information about an environment.

A combination of LIDAR and vision may be used to enhance the capabilities of three dimensional mapping and localization. However, existing limitations of each of LIDAR and vision systems, including vulnerability to weather conditions for example, persist.

Additional difficulties with existing systems may be appreciated in view of the Detailed Description of Example Embodiments, below.

SUMMARY

Example embodiments are directed to a system and method to build a map of an environment based on data acquired by side looking radar. For example, a side looking radar is mountable on one or both sides of a ground-based vehicle. As the vehicle moves, a scan of the environment is performed, wherein movement of the vehicle provides another dimension of information for the scan. Mapping of the environment is performed from the received reflected radio waves. Localization of the vehicle is also possible based on the received reflected radio waves.

In another example, the radar can further scan in the vertical plane at the same side looking angle to increase the field of view.

The radar data can be used to either form a 2D or 3D map, a 2D or 3D point cloud or a 2D or 3D radar image.

Dynamic objects within the environment may also be identified and removed with the remaining static objects being used to generate a map of the surrounding environment which may have object localization applications.

Further, radar is an electromagnetic wave which can pass through some materials like plastics, depending on the wavelength of the radar used. Therefore it can be possible to place radar sensors in an internal location such as behind the bumper of a vehicle, or even in the body of a vehicle.

Since the main sensor used here is radar, mapping, object detection and localization would not be adversely affected by weather condition or mud on the sensor.

In an example embodiment, there is provided a sensing system for a ground-based vehicle, the vehicle configured to move in a direction of travel. The sensing system includes at least one radar system mountable to the ground-based vehicle, wherein radio waves of the at least one radar system emit sideward to the direction of travel. The sensing system also includes memory and a processor. The processor is configured to: execute computer instructions causing the processor to generate a map of an environment based from at least electromagnetic radiation received by the radar system while the vehicle is moving, identify and remove dynamic objects from the environment, and generate a second map, of a static environment In another example embodiment, the radio waves scan in a 2D vertical plane at a fixed sideward direction.

In another example embodiment, there is provided a method for radar sensing from a ground-based vehicle using at least one radar system. The method includes: moving the vehicle in a direction of travel, emitting, from the at least one radar system, radio waves sideward to the direction of travel, generating a map of an environment based from at least electromagnetic radiation received by the radar system while the vehicle is moving, and generating a second map, of a static environment by identifying and removing dynamic objects.

In another example embodiment, there is provided a radar sensing system for a ground-based vehicle, the vehicle including a body having a front side and having two lateral sides to the front side. The sensing system includes at least one radar system mountable to one or both of the lateral sides of the body of the ground-based vehicle, memory, and a processor configured to execute computer instructions stored on the memory, the computer instructions causing the processor to generate a map of an environment based from at least electromagnetic radiation received by the radar system while the vehicle is moving, identify and remove dynamic objects from the environment, and generate a second map, of a static environment.

In another example embodiment, there is provided a sensing system for a ground-based vehicle, the vehicle configured to move in a direction of travel. The sensing system includes at least one radar system mountable to one or both of the lateral sides of the body of the ground-based vehicle wherein the radio waves of the at least one radar system are directed to scan in a 2D vertical plane at a fixed azimuth angle sideward to the direction of travel, memory, and a processor configured to execute computer instructions stored on the memory, the computer instructions causing the processor to generate a map of an environment based from at least electromagnetic radiation received by the radar system while the vehicle is moving.

BRIEF DESCRIPTION OF THE DRAWINGS

Embodiments will now be described by way of examples with reference to the accompanying drawings, in which like reference numerals may be used to indicate similar features, and in which.

DETAILED DESCRIPTION OF EXAMPLE EMBODIMENTS

LIDAR and vision systems can be used to generate map data. However, LIDAR systems have some limitations. For example, they are vulnerable to weather conditions. In addition, the wavelengths used in LIDAR systems are often not long enough to penetrate environmental contaminants such as dust and are attenuated by adverse weather conditions such as snow and fog. In addition, LIDAR system performance may be degraded if there is dirt, mud or some other physical contaminant on the LIDAR sensor. Accordingly, systems based on LIDAR exhibit poor performance in adverse weather conditions and LIDAR is therefore not a reliable sensor for localization in all conditions.

Vision systems are cheaper than LIDAR systems. However, they possess the same weaknesses in addition to being less accurate and being vulnerable to poor lighting conditions in the scanning environment. As a result, one challenge with environment sensing, detection and mapping is the need for a high resolution method of mapping an environment that can be deployed in various weather conditions and which is not susceptible to contamination of the sensor.

Furthermore, for example, sensors like LIDAR and vision based sensors can be based on light reflection. Therefore they need to have clear line of sight and are often therefore mounted externally.

Radar mapping systems use radio waves to determine the range, angle or velocity of objects or other attributes of an environment. Radar systems are often composed of a transmitter that emits radio waves (radar signals) in specified directions. When these come into contact with an object, some are reflected or scattered in many directions, and some are reflected back towards the transmitter. The radar system also includes a receiver that may be in the same location as the transmitter, and which captures the radar signals reflected by the environment. Radar systems may also include signal processors which may include digital signal processors, for recovering useful radar signals or to interpret the received radar signals.

Radio waves are only weakly absorbed by the media through which they pass and therefore radar can be used to detect objects at relatively long ranges—ranges at which some other electromagnetic wavelengths are too strongly attenuated. In addition, such weather phenomena as fog, clouds, rain, falling snow, and sleet that block visible, infrared and some ultraviolet light are usually transparent to radio waves and accordingly radar can operate in adverse weather conditions. Radio waves can be superior to ambient visible systems where lighting conditions are unreliable.

Some conventional methods exist for environmental mapping using radar. One such example is occupancy grid mapping by millimeter wave (MMW) radars which use long wavelengths to obtain renderings of the environment for mapping and localization in autonomous vehicle applications.

However, occupancy grid mapping scans the environment using radars that scan only in the horizontal plane. This produces a two dimensional map where each cell of the grid represents the probability of the cell being occupied. As a result, occupancy grid mapping cannot provide quality information about the three dimensional structure of the environment, or the size and shape of sensed objects within the environment.

Example embodiments are directed to a system and method to build a map of an environment based on data acquired by side looking radar. For example, a side looking radar is mountable to one or both sides of a ground-based vehicle. As the vehicle moves, a scan of the environment is performed, wherein movement of the vehicle provides another dimension of information for the scan. Mapping of the environment is performed from the received reflected radio waves. Localization of the vehicle is also possible based on the received reflected radio waves.

In another example, the radar can further scan in the vertical plane at the same side looking angle to increase the field of view.

The radar data can be used to either form a 2D or 3D map, 2D or 3D point cloud or a 2D or 3D radar image.

Dynamic objects within the environment may also be identified and removed with the remaining static objects being used to generate a map of the surrounding environment which may have object localization applications.

In an example embodiment, there is provided a sensing system for a ground-based vehicle, the vehicle configured to move in a direction of travel. The sensing system includes at least one radar system mountable to the ground-based vehicle, wherein radio waves of the at least one radar system emit sideward to the direction of travel. The sensing system also includes memory and a processor. The processor is configured to: execute computer instructions causing the processor to generate a map of an environment based from at least electromagnetic radiation received by the radar system while the vehicle is moving; identify and remove dynamic objects from the environment; and generate a second map, of a static environment.

In another example embodiment, the radio waves scan in a 2D vertical plane at a fixed sideward direction.

In another example embodiment, there is provided a method for radar sensing from a ground-based vehicle using at least one radar system. The method includes moving the vehicle in a direction of travel, emitting, from the at least one radar system, radio waves sideward to the direction of travel, generating a map of an environment based from at least electromagnetic radiation received by the radar system while the vehicle is moving, and generating a second map, of a static environment by identifying and removing dynamic objects.

In an example embodiment, there is provided a radar sensing system for a ground-based vehicle, the vehicle including a body having a front side and having two lateral sides to the front side. The sensing system includes at least one radar system mountable to one or both of the lateral sides of the body of the ground-based vehicle, memory, and a processor configured to execute computer instructions stored on the memory, the computer instructions causing the processor to generate a map of an environment based from at least electromagnetic radiation received by the radar system while the vehicle is moving, identify and remove dynamic objects from the environment, and generate a second map, of a static environment.

In another example embodiment, there is provided a sensing system for a ground-based vehicle, the vehicle configured to move in a direction of travel. The sensing system includes at least one radar system mountable to one or both of the lateral sides of the body of the ground-based vehicle wherein the radio waves of the at least one radar system are directed to scan in a 2D vertical plane at a fixed azimuth angle sideward to the direction of travel, memory, and a processor configured to execute computer instructions stored on the memory, the computer instructions causing the processor to generate a map of an environment based from at least electromagnetic radiation received by the radar system while the vehicle is moving.

Figure 3:
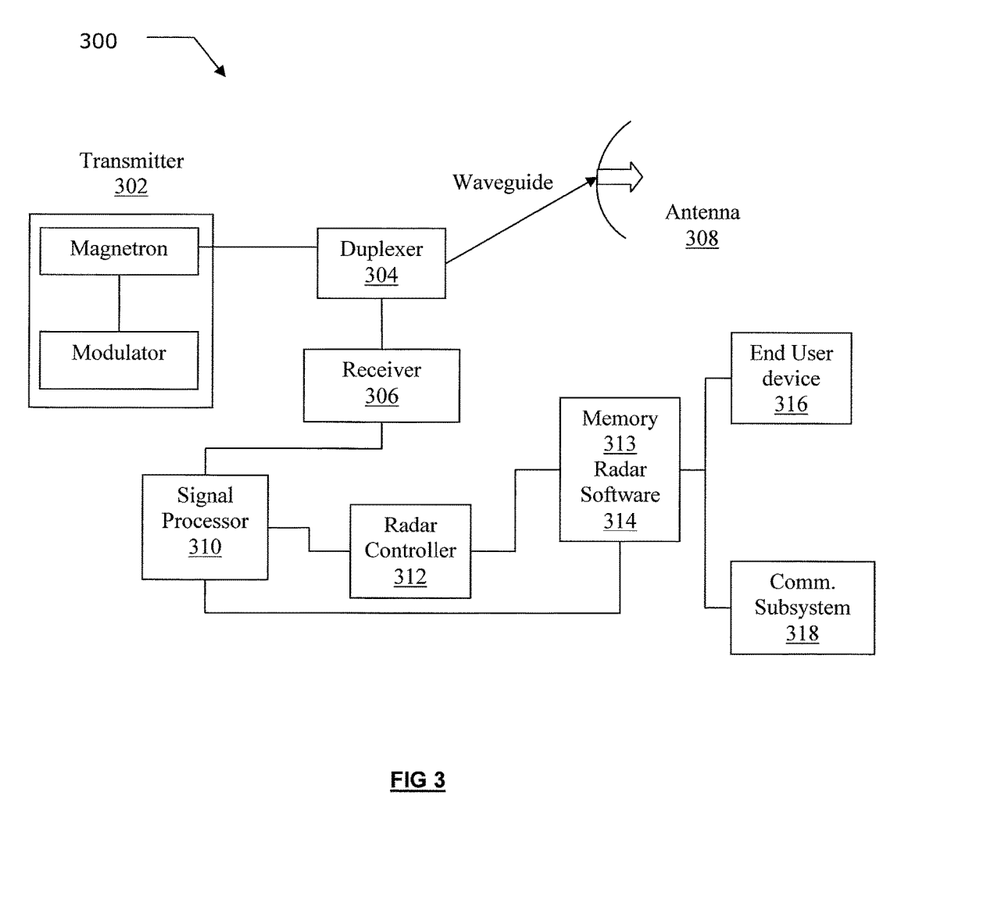
FIG. 3 is a block diagrammatic view of an example radar system, in accordance with an example embodiment.

Reference is first briefly made to FIG. 3, which shows a block diagrammatic view of an example radar system 300, in accordance with an example embodiment. The radar system 300 comprises at least one transmitter 302, at least one duplexer 304, at least one receiver 306, and at least one antenna 308. The antenna 308 may be rotated to direct the transmission of the radar signals and to facilitate the capture of reflected radar signals. The antenna 308 may be electrically steered, for example using phase shifting or frequency shifting, as is understood in the art. The antenna 308 can be directed so as to control the transmission of the radar signals and to facilitate the capture of reflected radar signals. The antenna 308 can be a dipole antenna and/or a grid-based antenna, for example, depending on the particular application. The duplexer 304 is used to alternate the antenna 308 between the transmitter 302 and the receiver 306, so that the same antenna 308 can be used for both transmit and receive functions. In some other example embodiments, a different antenna 308 is used for transmitting than for receiving. The antenna 308 is electrically or conductively connected to the transmitter 302 and the receiver 306.

Figure 1:
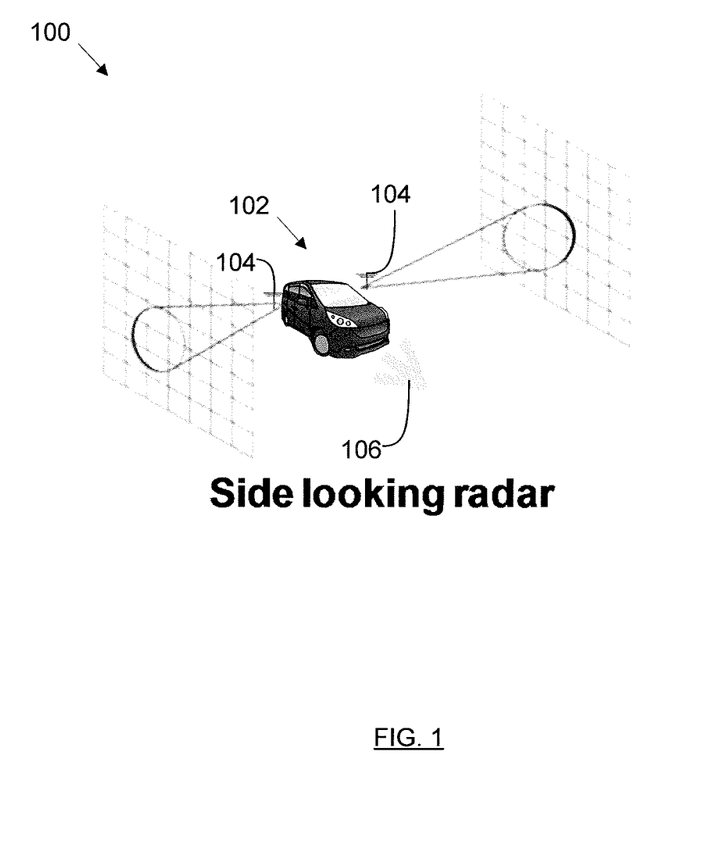
FIG. 1 is a diagrammatic view of an example sensing system, in accordance with an example embodiment.

Reference is now made to FIG. 1, which shows an example sensing system 100 for building a three dimensional (3D) map of an environment using information acquired by radar, in an example embodiment. The sensing system 100 includes a ground-based vehicle 102 equipped with at least one radar system 104 (two shown) directed to emit radio waves sideward to the direction of travel 106 of the vehicle 102. As shown in FIG. 1, one radar system 104 is mounted to each lateral side of the vehicle 102. In an example embodiment, the radar system 104 is not necessarily permanently mounted to vehicle 102, and in some example embodiments may be mounted or removed from vehicle 102 as necessary.

As shown in FIG. 1, each radar system 104 may be controlled to provide a fixed azimuth angle emission of radio waves, wherein the emitted radio waves are emitted only sideward or perpendicular to the direction of travel of the vehicle 102, for example at a fixed sideward azimuth angle. Received or reflected electromagnetic radiation received by each radar system 104 can then be used for map generation and localization. Movement of the vehicle 102 provides an additional dimension of information while the radar systems 104 are emitting in the fixed sideward azimuth direction. For example, less components or configuration would be required since less dimensions of scanning of the radar are needed. Accordingly, a 3D map of the environment and localization of the vehicle 102 can be determined when the vehicle 102 is moving. In an example embodiment, the radar system 104 can include a fixed direction antenna which always emits sideward without any steering control.

In another example embodiment, not shown here, the radar systems 104 are mounted at the lateral sides but interior to the shell of the vehicle 102. This protects the radar systems 104 from environmental factors and still permits radio waves to be transmitted and received through the material of the shell. This can also preserve visual aesthetics of the vehicle 102, for example.

Figure 2:
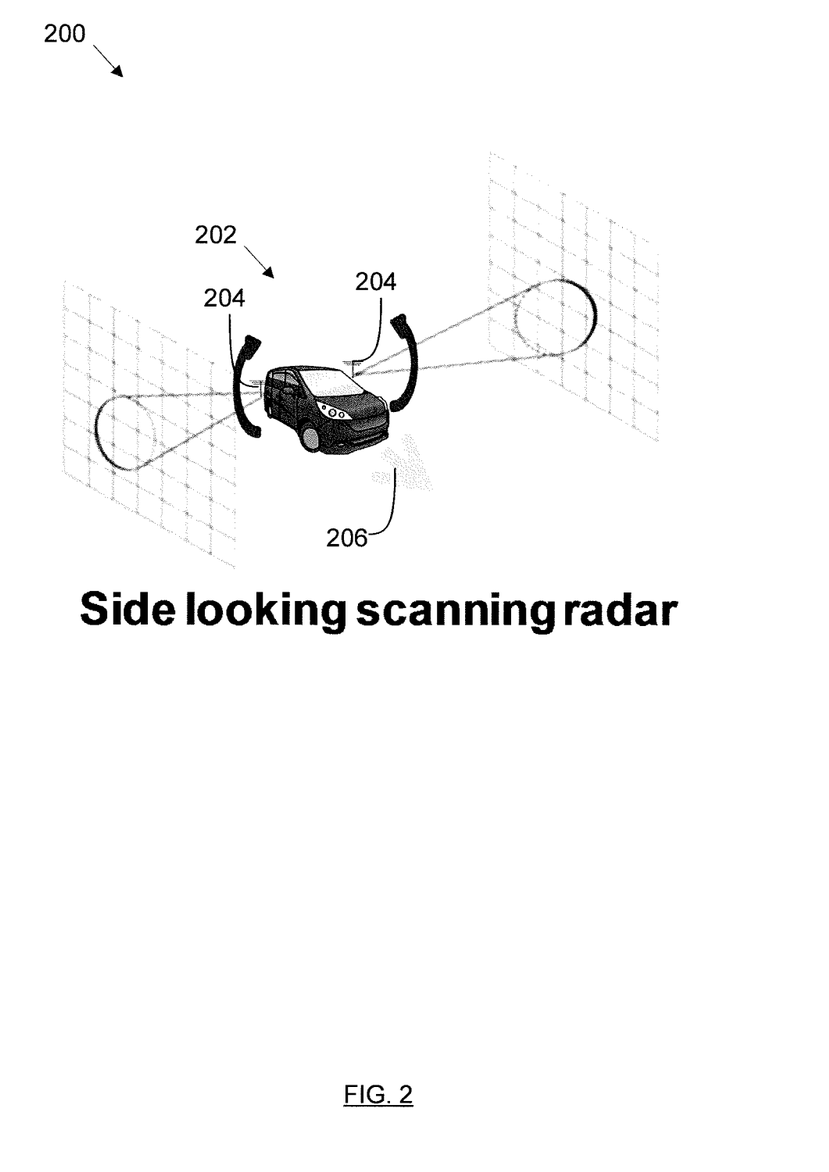
FIG. 2 is a diagrammatic view of another example sensing system, in accordance with another example embodiment.

FIG. 2 is a diagrammatic view of another example sensing system 200, in accordance with another example embodiment. In this embodiment, the sensing system 200 includes a ground-based vehicle 202 which emits radiation at a fixed sideward azimuth angle and further scans in a vertical plane (i.e. elevation plane).

The sensing system 200 includes a vehicle 202 equipped with at least one radar system 204 directed to emit radio waves sideward to the direction of travel 206 of the vehicle 202. As shown in FIG. 2, one radar system is mounted to each lateral side of the vehicle 202. In another example embodiment, not shown here, the radar systems 204 are mounted at the lateral sides but interior to the shell of the vehicle 202, wherein the shell includes radio wave transmissive material.

The sensing system 200 can be controlled to emit radio wave signals to scan in the vertical plane only, while maintaining the fixed sideward azimuth angle. For the vertical plane scanning, the sensing system 200 may use electrical beam scanning, mechanical scanning, or combination of electrical beam scanning and mechanical scanning.

Movement of the vehicle 202 provides an additional dimension of information while the radar systems 204 are emitting in the sideward direction. For example, less components or configuration or size of the sensing system 200 would be required since only components for vertical scanning radar are required, when compared to radar systems that scan in additional scanning dimensions. Accordingly, a 3D map of environment can be generated and localization of the vehicle 202 can be determined when the vehicle 202 is moving.

Since the main sensor used is radar, mapping, object detection and localization would not be adversely affected by weather condition or mud on the sensor.

In the described sensing systems 100, 200 there is leveraged the vehicle movement for imaging radar with a fixed direction radar or 2D scanning radar, which is sufficient for 3D mapping of the environment, and therefore there is no need for a 3D scanning radar, for example.

Referring again to FIG. 3, the radar system 300 includes a signal processor 310 which processes signals received from the receiver 306. The system 300 further includes a radar controller 312 which is operably connected and in communication with the components of the radar system 300 and which may use radar software 314 (stored on memory 313 of sensing system 100) to further process the signals received by the radar system 300 or to perform a radar scan. The signals may be used for generating 3D maps and for control or response by other subsystems, for example. The 3D maps can be stored in memory 313, sent to another device, or be generated by another device, for example. The signals may then be presented on various end user devices 316 which may be computer screens or other radar display units capable of displaying the signals processed by the radar system 300.

Referring again to FIG. 3, in relation to the sensing systems 100, 200, the data received by the receiver 306 may be subsequently processed by a signal processor 310 based on commands received from the controller 312. The controller 312 can include at least one processor (such as a microprocessor or other digital signal processor) which controls the overall operation of the radar system 300. The controller 312 may interact with the subsystems of the object on or in which it is mounted such as input subsystems, output subsystems, electrical subsystems and electro-mechanical subsystems which may already be part of the object. Various forms of software may be used to send or execute commands including to control the radar system 300.

The radar controller 312 may have access to memory 313 which can store instructions and programs for operation of the controller 312. The controller 312 can be configured to receive and send communications to internal or external devices by way of one or more communication subsystems 318. The controller 312 may include at least one data recording process for storing in memory 313 signals, data or images captured from the receiver 306 and processed by the controller 312. The radar data can be processed to generate, for example, a three dimensional point cloud of the environment or a radar image of the environment, which can be stored to memory 313, sent to other devices, and/or used to produce signals for human readable output devices. This data can form the basis for a three dimensional map of the environment. The 3D map can be generated by the controller 312, or from a remote device in other example embodiments. In addition, multiple scans of the environment may be conducted to gather increased environmental detail and to generate a three dimensional map with more environmental features. The radar system 300 may also use polarimetric radars which can provide more features of the environment to be included in the three dimensional map of the environment. Synthetic Aperture Radar (SAR) imaging, multispectral emission, and interferometry radar techniques can be used to facilitate generating of the map.

The surrounding environment may include dynamic (moving) objects or stationary objects which subsequently move and which are often not intended to be included in the map. Dynamic objects are objects that are in the environment for only a short discrete time frame such as a moving object like a person, animal or other vehicle. In some embodiments, the undesired objects are removed from the data so that a second (final) map is generated from the initial map, so that the final map only includes static environmental features. The signal processor 310 may use software or other means to execute instructions to remove objects from the data signals received by the receiver 306. Information about dynamic objects within the environment may also be relevant to other applications such as localization or navigation applications. In an embodiment, removal of dynamic objects is performed after all data is received by the receiver 306, wherein objects are identified and removed or otherwise not considered when generating the map. In some embodiments, removal of dynamic objects within the environment may not be necessary or object removal may not be necessary where there are no dynamic objects in the environment. Dynamic objects can be detected by, among other things, comparing map data from successive time slots to determine what objects are moving, and then the relevant data for such object removed from the map data or otherwise flagged within the data as relating to a dynamic object. In some examples, dynamic objects may be classed as such solely in dependence on detected stationary attributes of the object— for example a parked car may be classed as a dynamic object based on its size, shape, location and possibly other attributes. In some examples, dynamic objects may be classed as such based on their motion relative to the platform vehicle. For example, a car moving at the same speed as the platform vehicle may be classed as a dynamic object based on the relative difference in velocity between the car and the platform vehicle.

The remaining static objects within the environment are used to generate a three dimensional static map of the surrounding environment. This map can include all the static objects in an environment including both natural and artificial objects such as traffic signs, traffic lights, buildings, roads, trees, curbs and the like depending on the application and can be used for localization of the object on which the systems 100, 200, 300 is mounted and sensing of surrounding environmental features. Some example applications of the systems 100, 200, 300 include autonomous ground-based vehicles, robotics and civil engineering.

In addition, the systems 100, 200, 300 can include outputs (e.g. displays, heads-up displays, monitors, projectors, and/or speaker output) which include or display data about the environment such as the three dimensional map of the environment.

In an example embodiment, the radar system 300 can use an ultra wide band (UWB) radar that scans the environment using a beam with a narrow beam width to increase resolution and reduce noise. The frequency and wavelengths of the radar system may be varied depending on the application. Further multiple wavelengths can be used in order to gain additional information. Example wavelengths are provided in the following Table 1:

TABLE 1

Example Radar Frequency Bands

| Band name | Frequency range | Wavelength range | Application |
|---|---|---|---|
| HF | 3-30 MHz | 10-100 m | High frequency radars, Coastal radar systems, |
| VHF | 30-300 MHz | 1-10 m | Very high frequency radars, ground penetrating radars, geological or civil engineering |
| UHF | 300-1000 MHz | 0.3-1 m | Ultra high frequency, ballistic missile warning systems |
| L | 1-2 GHz | 15-30 cm | Long range radar, air traffic control and surveillance |
| S | 2-4 GHz | 7.5-15 cm | Short wave radar, terminal air traffic control, long-range weather, marine radar |
| C | 4-8 GHz | 3.75-7.5 cm | Medium range radar, weather |
| X | 8-12 GHz | 2.5-3.75 cm | Missile guidance, marine radar, weather, medium-resolution mapping and ground surveillance |
| $K_u$ | 12-18 GHz | 1.67-2.5 cm | High resolution, satellite transponders |
| K | 18-24 GHz | 1.11-1.67 cm | Cloud detection, police radar |
| $K_a$ | 24-40 GHz | 0.75-1.11 cm | Mapping, short range, airport surveillance, photo radars |
| V | 40-75 GHz | 4.0-7.5 mm | Millimeter band |
| W | 75-110 GHz | 2.7-4.0 mm | Millimeter band, autonomous vehicles, imaging |

An object on which the sensing system 100, 200 may be mounted, in example embodiments, can be a ground-based vehicle or moving object, or it may be mounted on a stationary object which is capable of being moved.

Figure 4:
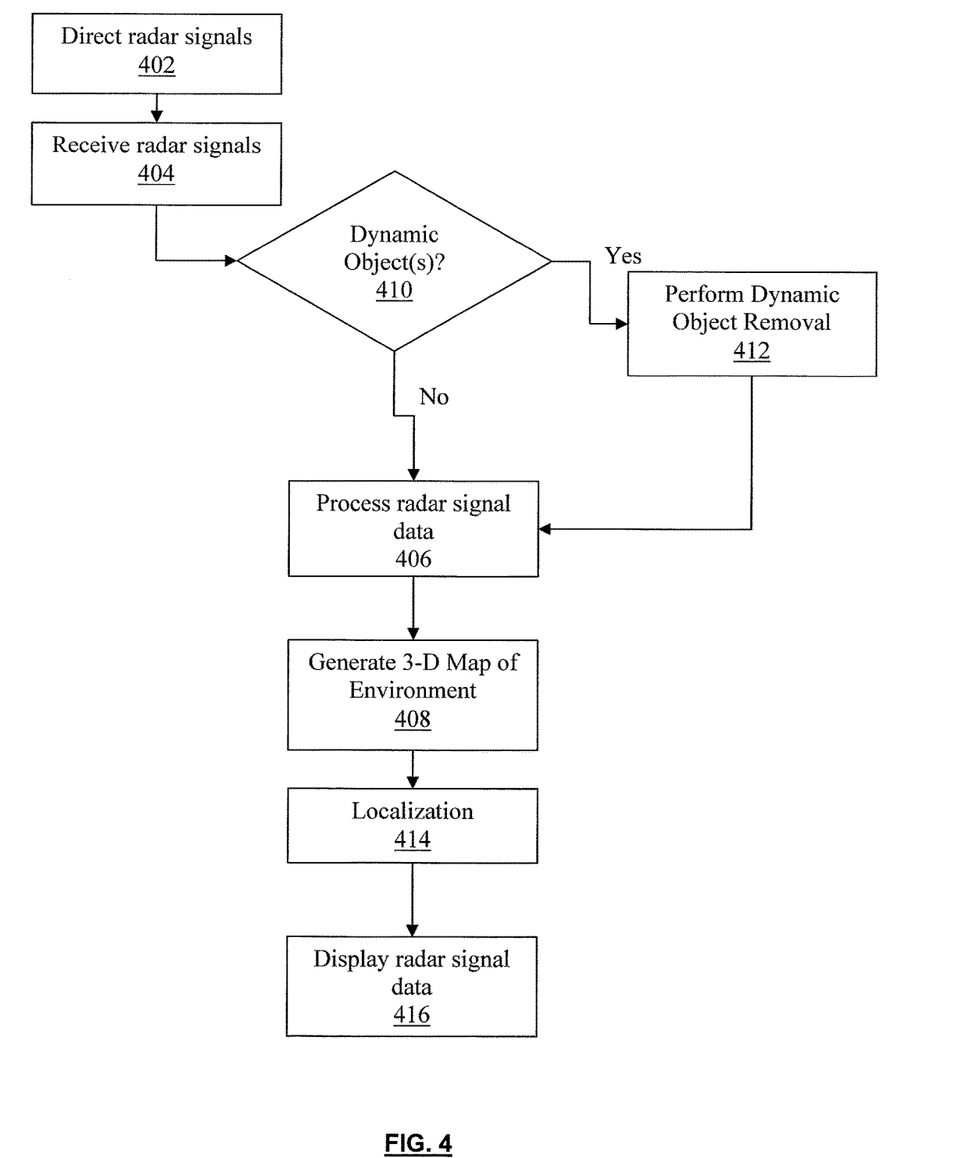
FIG. 4 illustrates a flow diagram for a method of operation of a radar system to generate a three dimensional map of an environment, in accordance with an example embodiment.

Referring now to FIG. 4, a method 400 is shown for determining an environment, for example using a radar system such as radar system 300. Radio signals are emitted from the antenna 308 using the transmitter 302, reflected radar signals are received from the environment, and feature extraction is performed from the radar signals. In some example embodiments, there is display of the map, features and/or radar data. The data displayed may be a three dimensional map of the environment which may be used for localization of the object on which the radar system is mounted.

At event 402, emissions from each antenna 308 may be directed sideward to provide a fixed azimuth angle emission of radio waves. In some example embodiments, the antenna 308 is already in a fixed directional position, and therefore event 402 does not involve any angular control, and the antenna 308 merely needs to be activated. In an example embodiment, the emitted radio waves can also scan in the vertical plane to increase the field of view, while maintaining the fixed azimuth angle.

Reflected radar signals, electromagnetic radiation, or other data are captured or received by one or more radar receivers at event 404. The data is transferred to a controller for image processing at event 406. The radar data can be processed at event 406 to form a three dimensional point cloud or a radar image of the surrounding environment. To generate a three dimensional map 408, events 402 and 404 may be repeated as multiple surveys of the same environment and which may also be used to improve detail on the environment being gathered. In an example embodiment, a decision event 410 may be included wherein the system 100 may include a dynamic object removal event 412 that removes dynamic objects from the data processed at event 406. The three dimensional map will then include only the static objects in the environment. Whether event 412 is performed will depend on the application. For instance, in applications where there are no dynamic objects such as parked or moving cars within an environment, event 412 may be omitted and the processing event 406 may be performed immediately after event 404. The three dimensional map generated at event 408 after processing event 406 may be used to perform object localization 414 of an object within the environment. The three dimensional map generated at event 408 may also be displayed at event 416. Event 416 may include display of the three dimensional map on a display unit such as a computer or other display unit capable of displaying the signals processed by the radar directing event 402.

Any vertical scanning performed at event 402 can be done using radar systems such as radar system 300 that use electrical beam steering or mechanical scanning, or a combination thereof to scan the environment.

Figure 5:
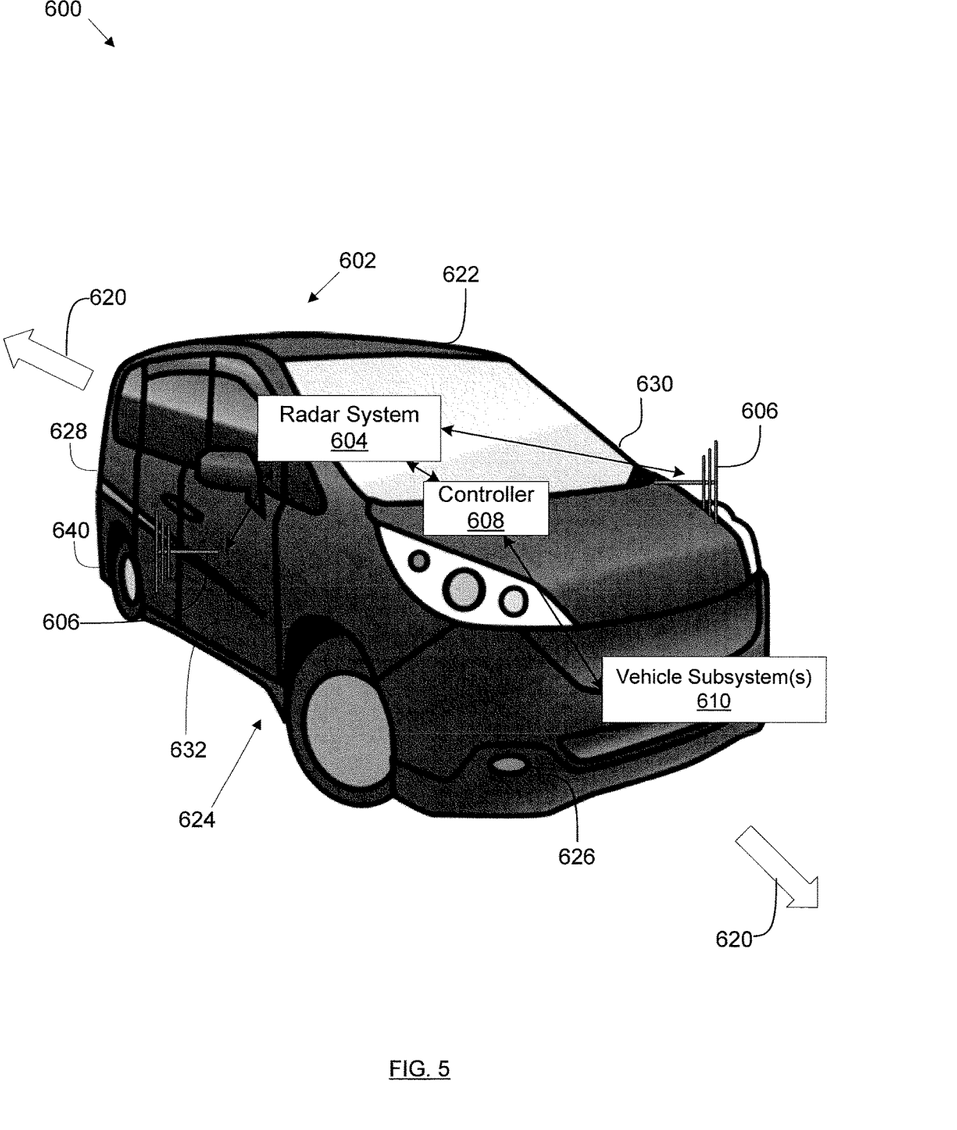
FIG. 5 shows a right perspective diagrammatic view of an example radar system for a ground-based vehicle, in accordance with an example embodiment.
Figure 6:
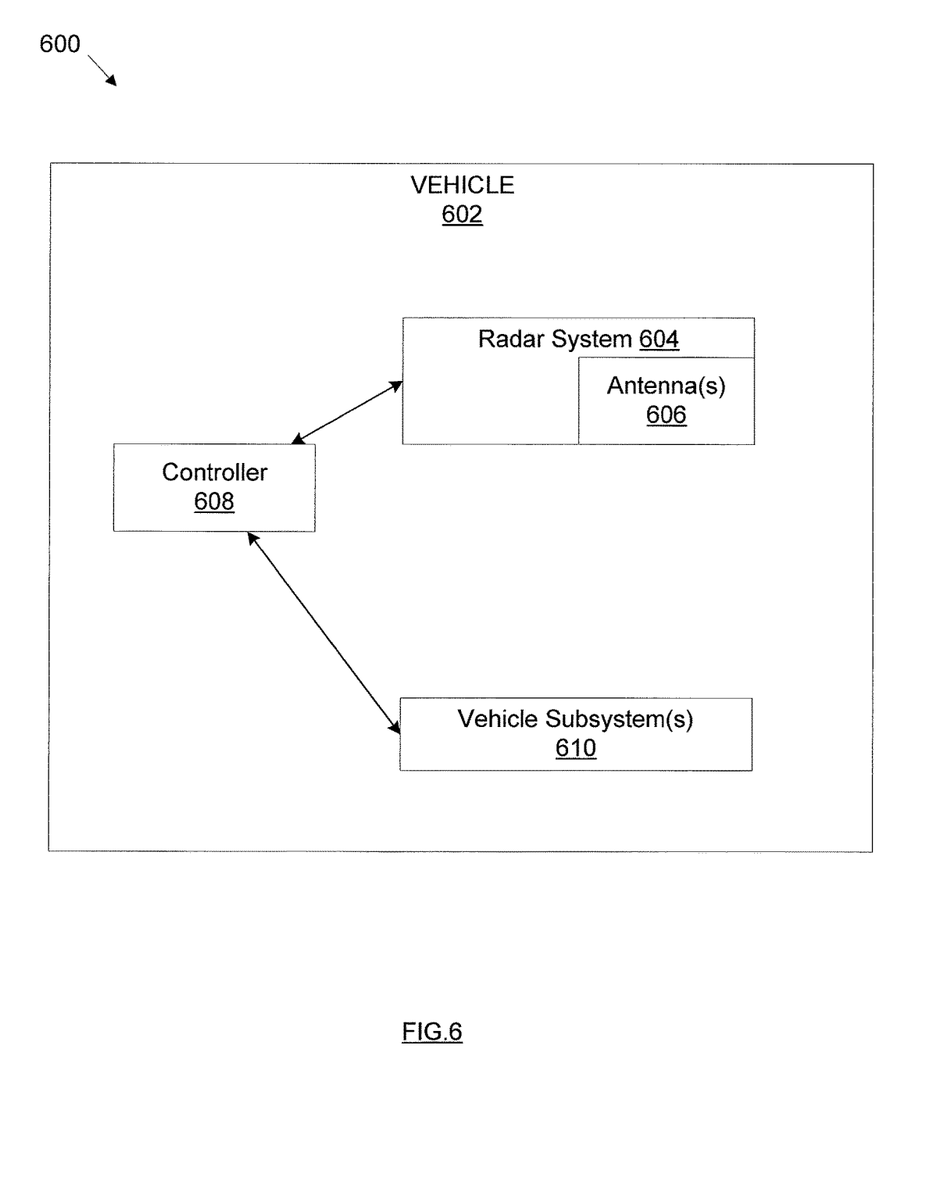
FIG. 6 illustrates a block diagram of the system shown in FIG. 5.

FIG. 5 shows a perspective diagrammatic view of an example sensing system 600 including a ground-based vehicle 602 with at least associated one radar system 604, in accordance with an example embodiment. FIG. 6 shows a block diagram of the sensing system 600. As shown in FIG. 5, the vehicle 602 can be an automobile in an example embodiment, and the radar system 604 includes at least one antenna 606 mounted on both sides of the vehicle 602. In an example embodiment, the radar system 604 can be part of at least one of the sensing systems 100, 200 described above, and can be controlled to operate in a manner of at least one of the processes 400, 700, for example. Each antenna 606 can also represent suitable positions for any radar emitting/sensing system, in accordance with example embodiments.

Generally, the sensing system 600 can be used for localization and mapping of the surrounding environment. When the vehicle 602 is moving, the radar system 604 can be activated to emit radio waves azimuthally sideward from vehicle 602. Therefore, another dimension of scanning is provided by movement of the vehicle 602. Another dimension of scanning can be provided by vertical scanning of the emitted radio waves at the same azimuth sideward angle.

The generated map can comprise at least one of a 3D map, 3D point cloud map, or radar image. The generated 3D map can be stored to memory such as memory 313 or may be used to build upon previous maps or future maps, or sent to a remote device, for example. The location of the vehicle 602 within the 3D map can also be determined using the radar system 604.

The sensing system 600 further includes at least one controller 608 which is operably connected to components of the radar system 604. The controller 608 can include at least one processor (such as a microprocessor) and memory such as memory 313 having stored thereon instructions, programs and applications executable by the processor. The sensing system 600 may also include other vehicle subsystems 610 which are operably connected to the controller 608.

The vehicle subsystems 610 can include resident in-vehicle subsystems, input subsystems, output subsystems, electrical subsystems and electro-mechanical subsystems. The controller 608 can be configured to receive and send data from and to the radar system 604 and the vehicle subsystems 610. The controller 608 may include at least one data recording process for storing data captured from the radar system 604 and/or the vehicle subsystems 610, and/or data processed therefrom.

In an example embodiment, a vehicle subsystem 610 can receive a command from the controller 608 in order to perform the particular command based on data detected by the radar system 604. In an example embodiment, data or map information is sent to the vehicle subsystem 610, such as information in relation to the static environment, a static object or a dynamic object. The data can also include the identification of the object, and can include other pertinent information about the object such as its speed and vector. The vehicle subsystem 610 can be configured to, in an example embodiment, receive and interpret that received data and execute its own command function(s) in response. Some vehicle subsystems 610 can include output subsystems (e.g. displays, monitors, projectors, and/or speaker output, etc.) which include pertinent data about a detected object or environment, or a specified action or command to be taken by the driver or another vehicle subsystem 610. Some vehicle subsystems 610 can include input subsystems, such as touch screen, microphone for voice input, steering control, and/or pedal control, etc.

Time of flight of the radio waves can be used to determine environment and objects around the vehicle 602. The determination of environment and objects can further be calculated based on the speed, vector and location of the vehicle 602, along with other information known to the controller 608. For example, speed, vector and location information of the vehicle 602 can be determined from speedometers and/or GPS. Therefore, the absolute or relative speed of other objects can be determined, including their direction of travel. As well, the location of other objects and environment can be determined. Doppler effects based on the relative speed of the vehicle 602 can also be used as part of the calculations, as would be understood in the art.

As shown in FIG. 5, the vehicle 602 is configured to move in a direction of travel 620, for example using a motor drive and wheels in the case of an automobile to move horizontally forward or backward, in various paths to arrive at a destination. As shown in FIG. 5, the body of the vehicle 602 includes a top 622, bottom 624, front side 626 and rear side 628. The vehicle 602 includes left side 630 and right side 632, which are transverse to the front side 626 and the rear side 628. The front side 626 and rear side 628 face in-line with the direction of travel 620, for example in the case of an automobile when the vehicle 602 is moving forwards or backwards. Other types of vehicles 602 may have other axes or directions of travel 620, not shown here, in other example embodiments.

As shown in FIG. 5, two of the antennas 606 are mounted on each transverse side 630, 632 of the vehicle 602, and can be controlled to emit radio waves azimuthally sideward to the vehicle 602. This can facilitate 3D radar scanning, because as the vehicle 602 moves, the radar system 604 is provided with another dimension of scanning due to movement of the vehicle 602.

In an example embodiment, side-mounted antennas 606 or radar systems can be used so as not to interfere with other detection systems, such as other top-mounted, forward or backward scanning systems which may include LIDAR or vision.

In an example embodiment, the sideward radio waves from the antenna 606 are emitted at a fixed sideward azimuth angle from the vehicle 602. For example, reference to sideward can comprise a perpendicular or 90 degree angle from the direction of travel or the front side 626 of the vehicle 602. In another example embodiment, another angle can include a suitable slight deviation from the perpendicular azimuth angle, for example ranging to plus or minus 15 degrees from the perpendicular (e.g. 75 to 105 degrees). In an alternate example embodiment, some azimuth angle scanning can be performed within this angle deviation, to provide further scanning information, for example. In an example embodiment, in addition to the sideward azimuth angle there could also be a fixed elevation angle for the same emitted radio wave, for example within a specified deviation from horizontal elevation (e.g. zero degree elevation), for example ranging to plus or minus 60 degrees or more from horizontal elevation.

The vehicle 602 can comprise a shell which generally surrounds the vehicle 602. In an example embodiment, the antenna 606 or an individual radar emitting/sensing system is mounted exterior to the shell.

In an example embodiment, at least part of the shell can be formed of radio wave transmissive material such as rubber, plastic, composite or polymer. In such an embodiment, the antenna 606 or an individual radar emitting/sensing system is mounted interior to the radio wave transmissive material. This protects the antenna 606 from environmental factors and still permits radio waves to be transmitted and received through the material of the shell. This can also preserve visual aesthetics of the vehicle 602, for example. An example location for this material can be interior to or within a bumper 640, such as the bumper 640 at the rear side 628. Other suitable areas of the vehicle 602 include a roof or additional roof cover at the top 622 which is formed of such material. Another example area of the shell is at the left side 630 and the right side 632, for example at a middle portion (e.g. vehicle door or panel) or side bumper area. At least two antennas 606 can be used in this case, one for each lateral side 630, 632. This contrasts with light-based detection systems which would be typically blocked by the shell of the vehicle 602.

In another example embodiment, not shown, at least one of the antennas 606 can be mounted on or at the rear side 628 of the vehicle 602 or the top 622 of the vehicle 602. In such an example embodiment, the radio waves from the antenna 606 can be activated (mechanically and/or electrically controlled or fixed direction) so as to emit radio waves at an azimuthally sideward angle to the vehicle 602. These mounting positions can be used for generation of 3D maps based on sideward readings taken when the vehicle 602 is moving, for example. Another dimension of scanning can be provided by vertical scanning of the emitted radio waves at the same azimuth sideward angle.

Referring still to FIGS. 5 and 6, the vehicle 602 can, in example embodiments, be ground-based including an automobile, truck, tractor, bus, motorcycle, locomotive, subway, hovercraft, snowmobile or heavy equipment vehicle. The vehicle 602 can further include an Inertial Measurement Unit (IMU), not shown, as one of the vehicle subsystems 610 to determine its own inertial forces, and to co-ordinate inertial data with the detected radar information, in an example embodiment.

In some example embodiments, the vehicle 602 comprises a fully autonomous ground-based vehicle or a semi-autonomous ground-based vehicle. Safety is an important goal in autonomous vehicles. Therefore, the usage of more robust and reliable sensors and methods should be used. Further, it is important for the automotive industry to reduce cost by reducing the number of sensors in autonomous vehicles. Since radar is one of the major components in autonomous vehicles for object detection, in example embodiments, adding more capabilities like localization and 3D sensing and imaging can be assistive and can help radar to replace or reduce the number of other sensors in autonomous vehicles, e.g., doing more with less sensors.

In an example embodiment, the autonomous vehicle 602 is configured to sense its environment and navigate without human input.

The vehicle 602 can be equipped with further sensory systems for detecting surrounding static environment or dynamic objects, without intending to be limiting. The vehicle subsystems 610 can include further sensory devices in addition to radar, such as LIDAR, vision-based systems, ultrasound, speedometers, odometers, IMU and GPS.

In an example embodiment, at least some or all aspects of the controller 608 are performed by at least two controllers. For example, some of the logic may be distributed to a resident radar controller 312 (FIG. 3) of the radar system 604 and/or a resident controller of one of the vehicle subsystems 610. Some of the processing may be distributed so that the controller 608 is primarily responsible for higher level monitoring, control, and command, while the other controllers have specific task functions. This allows, for example, the radar system 604 or vehicle subsystem 610 to perform its own responses at a faster rate or to perform its own local control or loop functions. The controller 608 would still be able to perform higher level functions and commands, such as localization, mapping and navigation, for example by continuously performing the described example methods.

Figure 7:
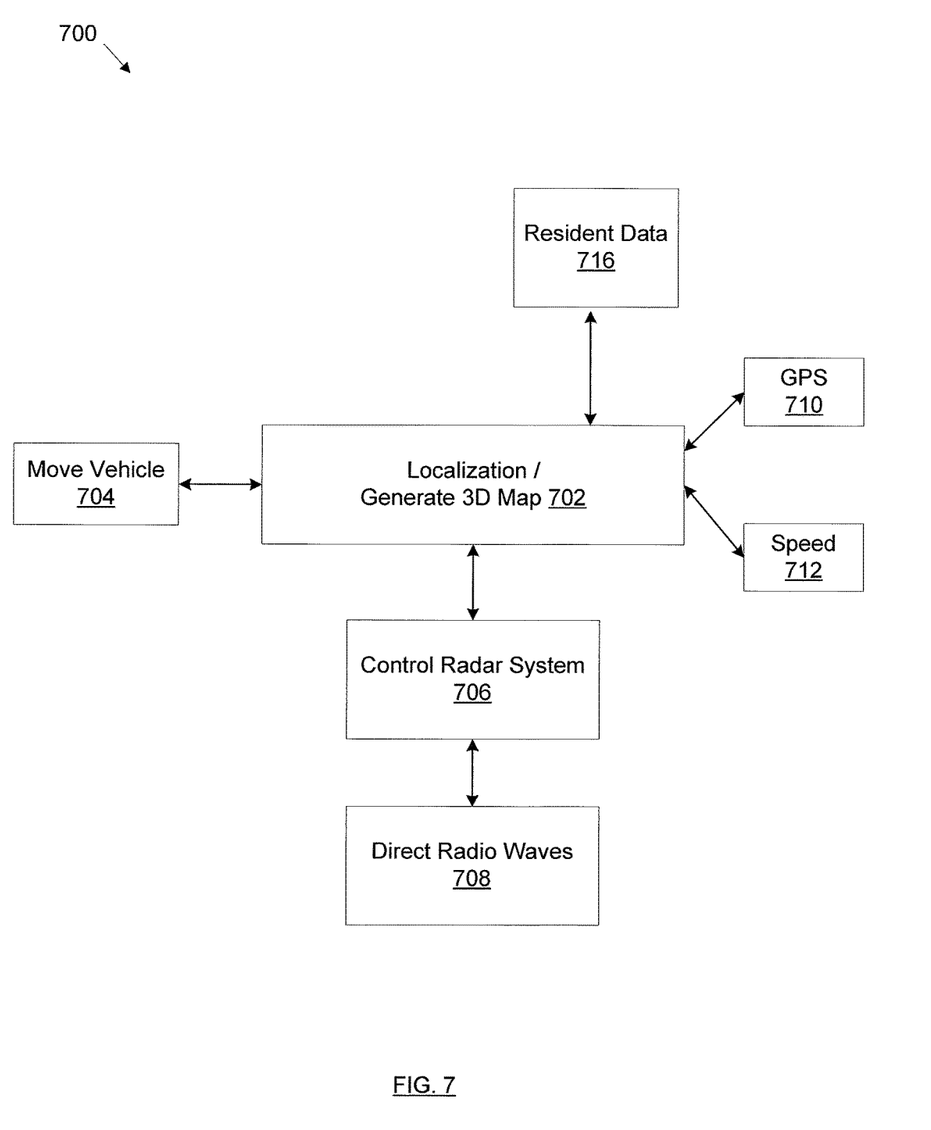
FIG. 7 illustrates a process diagram for localization and generation of a 3D map using the radar system of FIG. 5, in accordance with an example embodiment.

Reference is now made to FIG. 7, which illustrates a process 700 for localization and generation of a 3D map using the radar system 600, in accordance with an example embodiment. Some or all of the process 700 can be performed by the controller 608, in an example embodiment.

The process 700 can be performed dynamically in real-time in an example embodiment. At event 702, the 3D map of static environment is generated based on some or all of the events shown in the process 700, and localization of the vehicle 602 is used determine the location of the vehicle 602 within the 3D map of static environment. In some example embodiments, the 3D map is sent to a remote device and/or data is sent to a remote device which generates the 3D map. At event 704, the vehicle 602 is controlled to be moved for example either manually, semi-autonomously or autonomously. The vehicle 602 is moved in direction(s) of travel 620 in order to arrive at a desired destination. At event 706, the radar system 604 is activated so that radio waves are transmitted and electromagnetic radiation is received, for example. At event 708, activating the radar system 604 can include directing the radio wave(s) being transmitted, or in some instances the antenna 606 is already in a fixed sideward direction. For example, when the vehicle 602 is moving, the radar system 604 can be activated to emit radio waves azimuthally sideward to the vehicle 602. Therefore, another dimension of scanning is provided by movement of the vehicle 602. Another dimension of scanning can be provided by vertical scanning of the emitted radio waves at the same azimuth sideward angle.

Additional information can be used to correlate the speed, vector and location of the vehicle 602 with the received electromagnetic radiation in order to generate the 3D map and for localization of the vehicle 602. For example, at event 710 positioning information and speed information can be received from a GPS or other suitable device, for example to correlate such information. For example, at event 712 speed information can be received from a speedometer.

Resident data can be accessed from resident memory at event 716. Any accessed data can include a library which contains additional map or object information, including previously known maps. Accessed data can be used to identify specific shapes as identifiable objects, such as traffic signs, traffic lights, buildings, trees, curbs, rocks, etc.

Static and dynamic objects and the static environment can be identified from events 704, 706, 708, 710, 712, 716. At event 718, data can be further processed to remove the dynamic objects in order to generate a 3D map of the static environment and to assist with localization within the 3D map.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A sensing system comprising:
   a ground-based vehicle configured to move in a direction of travel;
   at least one radar system mountable to the ground-based vehicle, each radar system configured to emit radio waves at a fixed sideward azimuth angle to the direction of travel, capture electromagnetic radiation, and generate radar data based on the captured electromagnetic radiation while the vehicle is moving;
   memory; and
   a processor operably coupled to the memory and each radar system, the processor configured to execute computer instructions stored in the memory, the computer instructions causing the processor to:
      receive speed information and positioning information of the vehicle from a controller of vehicle while the vehicle is moving;
      generate a three-dimensional map of an environment surrounding the vehicle based on the radar data received from each radar system, the speed information and the positioning information of the vehicle, the three-dimensional map including objects; and
      generate a second three-dimensional map of a static environment surrounding the vehicle by identifying dynamic objects from the objects included in map of the environment and removing the dynamic objects from the map.

2. The sensing system of claim 1, wherein the processor is further configured to execute computer instructions stored on the memory to cause the processor to process the radar data to generate 3D point clouds or radar images and wherein the map is generated based on the 3D point clouds or radar images.

3. The sensing system of claim 1, wherein the vehicle includes a body having a front which faces in-line with the direction of travel and two lateral sides, wherein the at least one radar system is mountable to one of the lateral sides.

4. The sensing system of claim 1, wherein the vehicle further includes a shell, wherein at least one of the at least one radar system is mountable interior of the shell.

5. The sensing system of claim 1, wherein the processor is further configured to execute computer instructions stored on the memory to cause the processor to control the radar system to emit radio waves only sideward to the direction of travel.

6. The sensing system of claim 1, wherein the processor is further configured to execute computer instructions stored on the memory to cause the processor to control the radar system to vertically scan in a 2D vertical plane.

7. The sensing system of claim 1, wherein the vehicle is an autonomous vehicle.

8. The sensing system of claim 1, wherein the processor is further configured to execute computer instructions stored on the memory to cause the processor to process the radar data by applying synthetic aperture radar (SAR) techniques to produce 3D images.

9. A method for radar sensing from a ground-based vehicle using at least one radar system mountable to the ground-based vehicle, the method comprising:
   moving the vehicle in a direction of travel;
   controlling emitting, from the at least one each radar system to emit radio waves sideward to the direction of travel at a fixed sideward azimuth angle to the direction of travel of the vehicle;
   processing, at each radar system, electromagnetic radiation captured by the radar system to generate radar data while the vehicle is moving;
   receiving speed information and positioning information of the vehicle from a controller of vehicle while the vehicle is moving;
   generating a three-dimensional map of an environment surrounding the vehicle based on the radar data received from each radar system, the speed information, and the positioning information, the three-dimensional map including objects;
   generating a second three-dimensional map, of a static environment surrounding the vehicle, by identifying and removing dynamic objects from the objects included in the map.

10. The method of claim 9, processing the radar data to generate 3D point clouds or radar images.

11. The method of claim 9, wherein the vehicle includes a body having a front which faces in-line with the direction of travel and two lateral sides to the front side, wherein at least one of the at least one radar system is mountable to one of the lateral sides.

12. The method of claim 9, wherein emitting comprises emitting the radio waves only emit sideward to the direction of travel.

13. The method of claim 9, wherein emitting comprises directing the radio waves to scan in a 2D vertical plane.

14. The method of claim 9, further comprising processing the radar data by applying synthetic aperture radar (SAR) techniques to produce 3D images.

15. A radar sensing system for a ground-based vehicle, the vehicle including a body having a front, a back and two lateral sides, the sensing system comprising:
   at least one radar system mountable to one of the lateral sides of the body of the ground-based vehicle, each radar system configured to emit radio waves at a fixed sideward azimuth angle to an axis extending between the front and the back of the vehicle, capture electromagnetic radiation, and generate radar data based on the captured electromagnetic radiation while the vehicle is moving;
   memory;
   a processor operably coupled to each radar system and the memory, the processor configured to execute computer instructions stored on the memory, the computer instructions causing the processor to:
     receive speed information and positioning information of the vehicle from a controller of vehicle while the vehicle is moving;
     process the radar data received from each radar system, the speed information, and the positioning information to determine an environment surrounding the vehicle and identify static and dynamic objects around the vehicle;
     generate a three-dimensional map of an environment surrounding the vehicle based on the determined environment and the identified static objects.

16. The radar sensing system of claim 15, wherein the processor is further configured to execute computer instructions stored on the memory to cause the processor to process the radar data to generate 3D point clouds or radar images and wherein the map is generated based on the 3D point clouds or radar images.

17. The sensing system of claim 15, wherein the vehicle further includes a shell, wherein at least one of the at least one radar system is mountable interior of the shell.

18. The sensing system of claim 15, wherein the processor is further configured to execute computer instructions stored on the memory to cause the processor to control the radar system to emit radio waves only sideward to the direction of travel.

19. The sensing system of claim 15, wherein the processor is further configured to execute computer instructions stored on the memory to cause the processor to control the radar system to vertically scan in a 2D vertical plane.

20. The sensing system of claim 15, wherein the vehicle is an autonomous vehicle.

21. The sensing system of claim 15, wherein the processor is further configured to execute computer instructions stored on the memory to cause the processor to process the radar data by applying synthetic aperture radar (SAR) techniques to produce 3D images.

* * * * *